UNITED STATES PATENT OFFICE.

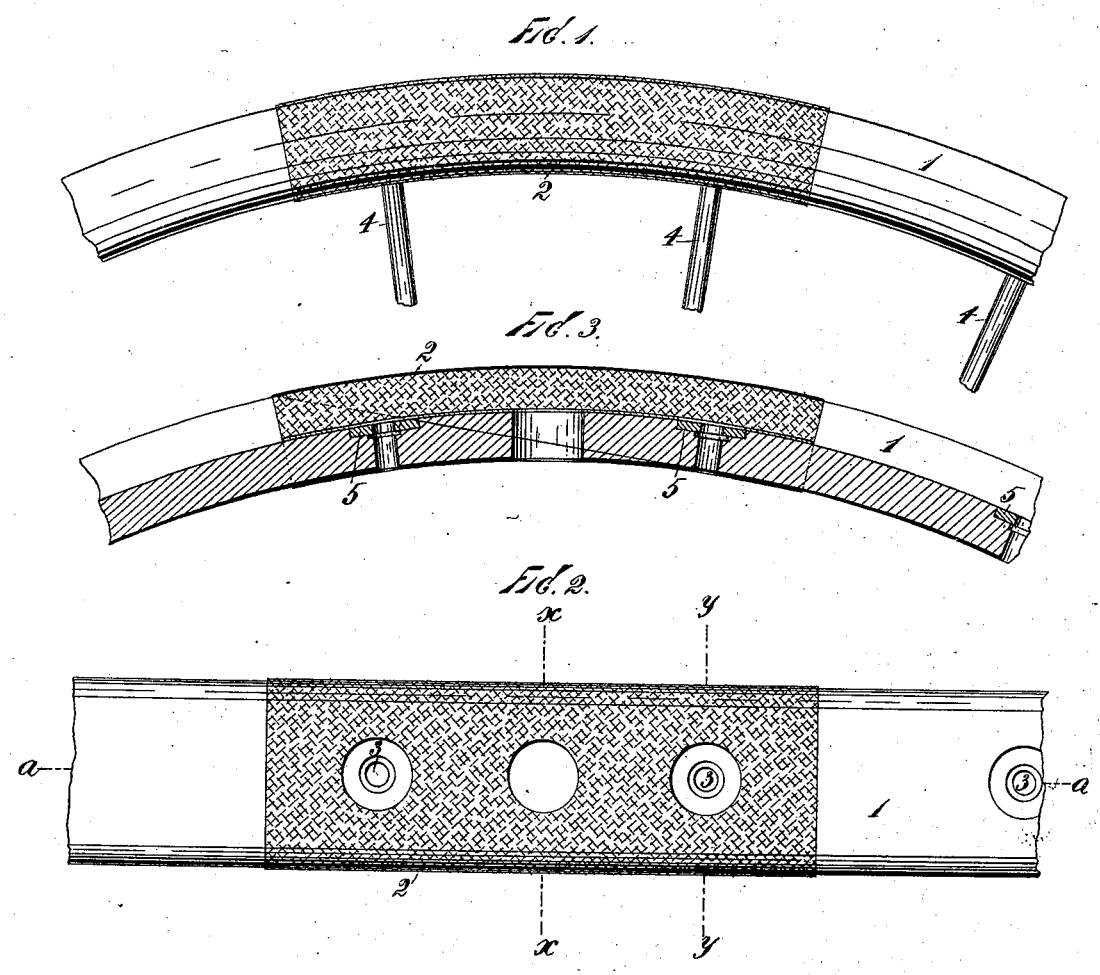

CHARLES F. HARRINGTON, OF LYNDHURST, NEW JERSEY, ASSIGNOR TO McKEE & HARRINGTON, OF NEW YORK, N. Y.

WHEEL.

SPECIFICATION forming part of Letters Patent No. 506,430, dated October 10, 1893.

Application filed March 6, 1893. Serial No. 464,643. (No model.)

*To all whom it may concern:*

Be it known that I, CHARLES F. HARRINGTON, a citizen of the United States, residing in Lyndhurst, Bergen county, State of New Jersey, have invented a new and useful Improvement in Wheels, of which the following is a specification.

My invention relates especially to the construction of wheels, particularly such as are employed upon bicycles, having elastic tires, either solid, cushion or pneumatic, and has for its object the provision of a light, rigid, simple and cheap felly, forming a part of a wheel.

To attain the desired end, my invention consists essentially in certain novel and useful combinations or arrangements of parts, and peculiarities of construction, all of which will be hereinafter first fully described and then pointed out in the claims.

In the acccompanying drawings, Figure 1 is a side view of a portion of a wheel embodying my invention. Fig. 2 is an outside or top view thereof. Fig. 3 is a longitudinal, sectional view at line $a-a$ of Fig. 2. Fig. 4 is a cross-sectional view at line $x-x$ of Fig. 2, and Fig. 5 is a like view at line $y-y$ of the same figure.

Similar numerals of reference, wherever they occur, indicate corresponding parts in all the figures.

The object of this invention is to lessen the weight of a bicycle wheel, and at the same time increase its rigidity. To accomplish this, I make the rim or felly, 1, of a single piece of wood (preferably white ash) dressed out to the proper width and thickness, each end being cut tapering, as illustrated in Fig. 3 of the drawings, or fitted so that when bent to a true circle of the required diameter, and the ends lapped over, it will be of the same thickness as the other parts of the rim, the steaming and bending being done by any of the well known methods. After drying, the parts of the joint are glued or cemented together, and when dry, the outside of the rim is turned or molded to the proper shape to receive a rubber tire, and the inner surface rounded to the requisite shape, the rim being preferably made thicker in the middle than at the edges. The joint is now covered with strong, but thin cloth 2, or other flexible material, the same being glued or cemented to the wood, thus making the joint the strongest part of the rim, and when finished with the proper care, the joint will be hardly noticeable.

The holes 3, for the reception of the spokes 4, require some protection to prevent the spoke or nipple pulling through, and this is accomplished by counterboring the wood, and putting within the counterbore, a metal washer, 5, with a hole in its center the proper size to receive the spoke, the top or face of the washer being flush with the body of the rim.

A rim constructed as above set forth, will be much lighter than steel, and stronger than a steel rim nearly twice as heavy.

Having now fully described my invention, what I claim as new therein, and desire to secure by Letters Patent, is—

1. The herein described method of making a rim for rubber tired bicycle wheels; that is to say, by bending a single flat piece of wood in a circle, splicing the meeting ends and then turning the rim to the requisite shape, substantially as set forth and described.

2. A wood rim for a rubber tired bicycle wheel, bent from a single piece, with a lapped joint, as set forth, said joint being covered with cloth, or equivalent flexible material, glued or cemented to the wood, substantially as shown and described.

3. A wood wheel rim adapted and arranged to receive a rubber tire, said rim being formed and bent from a single piece of wood, the ends being tapered or fitted to form a lap joint, glued or cemented together, and then covered with cloth, or other flexible material, glued or cemented to the wood, substantially as shown and described.

4. A wood wheel rim adapted and arranged to receive a rubber tire, said rim being bent from a single piece of wood, and provided with holes to receive the spokes, metallic washers being seated in the wood surrounding the spoke holes, protecting the wood and preventing the drawing of the spokes therefrom, substantially as shown and described.

5. A wheel of the character herein specified, in which is comprised a wood rim arranged to receive a rubber tire, said rim being bent from a single piece of wood, having a lap joint covered with cloth or other strengthening material, and having a metal support in the bottom of the groove to prevent the spokes drawing from the wood.

CHARLES F. HARRINGTON.

Witnesses:
LOUIS R. LeCLEAR,
JOHN E. TRAVERS.